(12) United States Patent
Bhatt

(10) Patent No.: US 11,915,071 B1
(45) Date of Patent: Feb. 27, 2024

(54) CACHING OUTLINE CHARACTERS IN PRINTED DOCUMENTS

(71) Applicant: KYOCERA DOCUMENT SOLUTIONS INC., Osaka (JP)

(72) Inventor: Jayant Bhatt, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/973,874

(22) Filed: Oct. 26, 2022

(51) Int. Cl.
*G06K 15/02* (2006.01)

(52) U.S. Cl.
CPC ..... *G06K 15/1828* (2013.01); *G06K 15/1802* (2013.01); *G06K 15/1843* (2013.01)

(58) Field of Classification Search
CPC .................................. G06K 15/1828
USPC ......................................... 358/1.2
See application file for complete search history.

(56) References Cited

U.S. PATENT DOCUMENTS

| 5,276,790 A | 1/1994 | Lo et al. |
| 5,367,620 A * | 11/1994 | Ito ........................ G06K 15/02 345/555 |
| 5,594,472 A | 1/1997 | Date |
| 5,825,926 A | 10/1998 | Tanaka |
| 5,963,655 A * | 10/1999 | Sakurai .................. G06K 15/02 382/113 |
| 6,393,145 B2 | 5/2002 | Betrisey et al. |
| 6,753,862 B1 * | 6/2004 | Miyasaka ................ G09G 5/28 345/472 |
| 2010/0188408 A1 | 7/2010 | Perry et al. |
| 2022/0044083 A1 * | 2/2022 | Kanazawa ......... G06K 15/1834 |

FOREIGN PATENT DOCUMENTS

JP H02243366 A 9/1990

* cited by examiner

*Primary Examiner* — Jacky X Zheng
(74) *Attorney, Agent, or Firm* — GrowIP Law Group LLC

(57) ABSTRACT

Methods, systems, and storage media for outline character printing on a printing device are disclosed. Exemplary implementations may: allocate cache memory of a printing device for registration of an outline character; register outline character data wherein the metadata portion comprises a description of the outline character and the data portion comprises a scanline table for the outline character; receive a print job data at the printing device; determine the print job data identifies the outline character in the cache memory at the printing device; render the scanline table accessed from the cache memory as a pattern of pixels for the outline character for the print job data received; and print, on the printing device, the pattern of pixels rendered from the scanline table accessed from the cache memory for the print job data received.

20 Claims, 8 Drawing Sheets

Scanlines of coordinates represented by dots (flower coordinates).
(1, 3)
(1.5, 3)
(2, 3)

(1, 2.98)
(1.4, 2.98)

(1.6, 2.98)
(2, 2.98)

(1.4, 2.96)
(1.6, 2.96)

(1.4, 2.9)
(1.6, 2.9)

CACHING OUTLINE CHARACTERS IN PRINTED DOCUMENTS

FIELD

This disclosure relates to the field of printing, and, in particular, technologies for outline character printing on a printing device.

BACKGROUND

Printing devices (also referred to as print devices or printers herein) process and print bitmap characters and outline characters. Bitmap characters (or bitmap fonts) are traditionally used for printing text. Bitmap characters are formed from pixels, stored in their full-size, bitmap forms and are fast and easy to print. Bitmap characters are not scalable and typically have a different character for different sizes. Outline characters (or outline fonts), from services like Monotype Imaging Holdings Inc., are increasingly being used by graphic designers. Outline characters are characters which are represented by a mathematical expression and use a series of curves and geometric outlines to outline and form letters and characters. Outline characters, unlike bitmap characters, are scalable and the quality of the outline character remains the same regardless of size.

Needed are improved techniques for efficiently printing outline characters on printing devices.

SUMMARY

One aspect of the present disclosure relates to a method for outline character printing on a printing device. The method may include allocating cache memory of a printing device for registration of an outline character. The cache memory may include a data portion and a metadata portion. The method may include registering outline character data wherein the metadata portion includes a description of the outline character, and the data portion includes a scanline table for the outline character. The method may include receiving a print job data at the printing device. The method may include determining the print job data identifies the outline character in the cache memory at the printing device. The method may include rendering the scanline table accessed from the cache memory as a pattern of pixels for the outline character for the print job data received. The method may include printing, on the printing device, the pattern of pixels rendered from the scanline table accessed from the cache memory for the print job data received.

Another aspect of the present disclosure relates to a system configured for outline character printing on a printing device. The system may include one or more hardware processors configured by machine-readable instructions. The processor(s) may be configured to perform processes to allocate cache memory of a printing device for registration of an outline character. The cache memory may include a data portion and a metadata portion. The processor(s) may be configured to register outline character data wherein the metadata portion includes a description of the outline character, and the data portion includes a scanline table for the outline character. The processor(s) may be configured to receive a print job data at the printing device. The processor(s) may be configured to determine the print job data identifies the outline character in the cache memory at the printing device. The processor(s) may be configured to render the scanline table accessed from the cache memory as a pattern of pixels for the outline character for the print job data received. The processor(s) may be configured to print, on the printing device, the pattern of pixels rendered from the scanline table accessed from the cache memory for the print job data received.

Yet another aspect of the present disclosure relates to a non-transient computer-readable storage medium having instructions embodied thereon, the instructions being executable by one or more processors to perform a method for outline character printing on a printing device. The method may include allocating cache memory of a processor of a printing device for registration of an outline character. The cache memory may include a data portion and a metadata portion. The method may include registering outline character data wherein the metadata portion includes a description of the outline character, and the data portion includes a scanline table for the outline character. The method may include receiving a print job data at the printing device. The method may include determining the print job data identifies the outline character in the cache memory at the printing device. The method may include rendering the scanline table accessed from the cache memory as a pattern of pixels for the outline character for the print job data received. The method may include printing, on the printing device, the pattern of pixels rendered from the scanline table accessed from the cache memory for the print job data received.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

The accompanying drawings are included to provide a further understanding of the systems, apparatus, devices, and/or methods of the disclosure, and are incorporated in and constitute a part of this specification. The drawings are not necessarily to scale, and sizes of various elements may be distorted for clarity and/or illustrated as simplistic or conceptual representations to promote comprehension. The drawings illustrate one or more embodiments of the disclosure, and together with the description, serve to explain the principles and operation of the disclosure.

DETAILED DESCRIPTION

Figure 1:
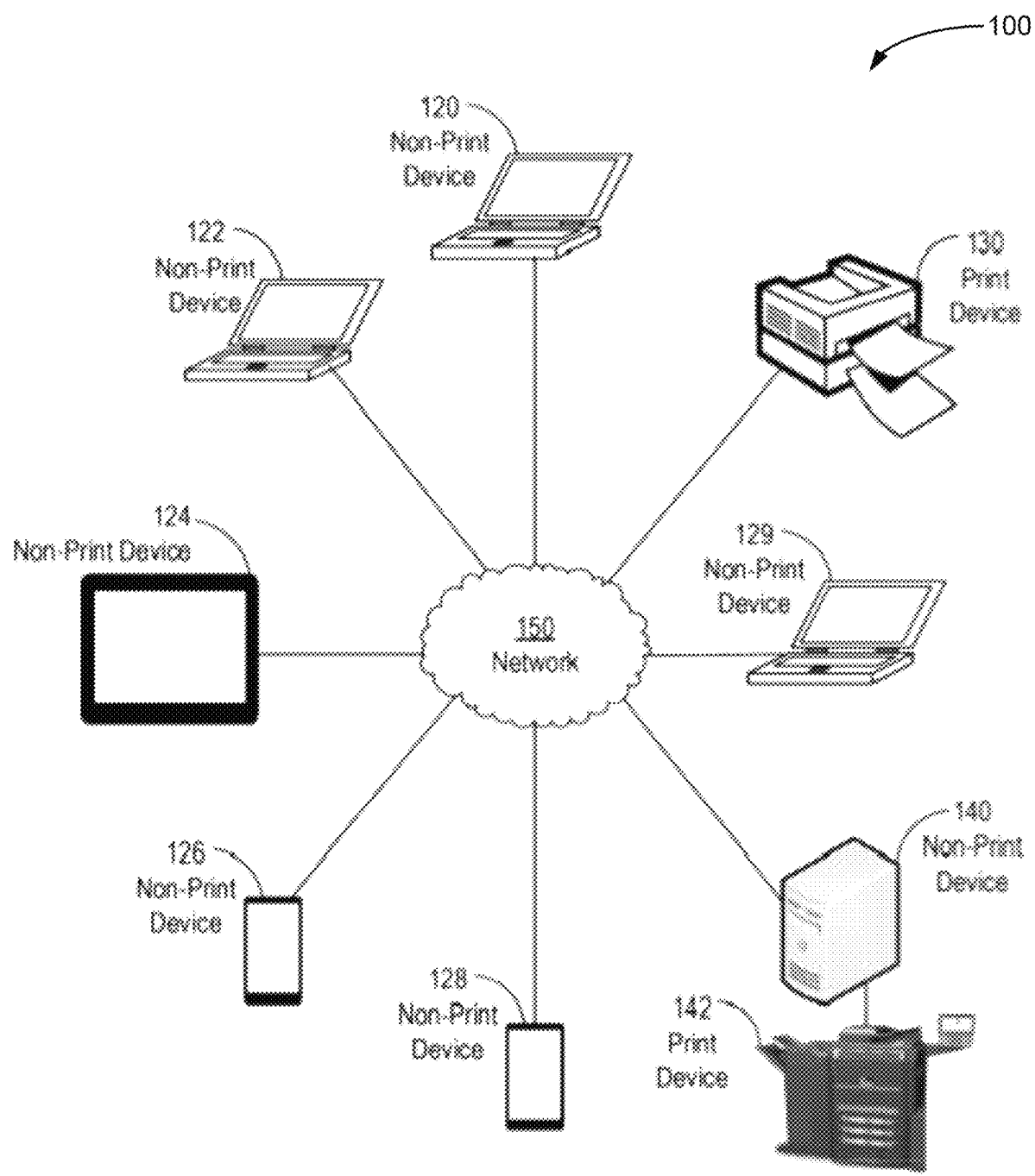
FIG. 1 is block diagram illustrating a printing network, according to an example embodiment.

Example systems, apparatus, devices, and/or methods are described herein. It should be understood that the word "example" is used to mean "serving as an example, instance, or illustration." Any embodiment or feature described herein as being an "example" is not necessarily to be construed as preferred or advantageous over other embodiments or features unless stated as such. Thus, other embodiments can be utilized, and other changes can be made, without departing from the scope of the subject matter presented herein. The aspects described herein are not limited to specific embodiments, apparatus, or configurations, and as such can, of course, vary. It should be readily understood that the aspects of the present disclosure, as generally described herein, and illustrated in the figures, can be arranged, substituted, combined, separated, and designed in a wide variety of different configurations. It is also to be understood that the terminology used herein is for the purpose of describing particular aspects only, and unless specifically defined herein, is not intended to be limiting.

Throughout this specification, unless the context requires otherwise, the words "comprise" and "include" and variations (e.g., "comprises," "comprising," "includes," "including," "has," and "having") will be understood to imply the inclusion of a stated component, feature, element, or step or group of components, features, elements, or steps, but not the exclusion of any other component, feature, element, or step or group of components, features, elements, or steps.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

As used in the specification and the appended claims, the singular forms "a," "an," and "the" include plural referents unless the context clearly dictates otherwise.

Ranges can be expressed herein as from "about" or "approximately" one particular value and/or to "about" or "approximately" another particular value. When such a range is expressed, another aspect includes from the one particular value and/or to the other particular value. Similarly, when values are expressed as approximations by use of the antecedent "about" or "approximately," it will be understood that the particular value forms another aspect. It will be further understood that the endpoints of each of the ranges are significant both in relation to the other endpoint and independently of the other endpoint.

Any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

Outline characters, which are increasingly being used by graphic artists, have poor printing performance. Outline characters or outline fonts are geometric outlines of letter and characters. Outline characters are a series of curves and lines represented by a mathematical expression. Outline characters are scalable such that a printing device can generate the outline character at any scale without losing resolution. As outline characters can be scaled without losing quality, they offer an option to graphic designers seeking to create a crisp, resolution-independent design. However, to render and print an outline character on a printing device, data, such as a mathematical expression, is fetched by a printing device from a non-printing device (e.g., a font rasterizer) whenever an outline character is sent to the printing device. Fetching data from a non-printing device requires additional processing and time and causes printing delays. In addition, the mathematical expressions fetched from the non-printing device's font rasterizer are converted to a scanline table by the printer drawing service, leading to further delays.

Typical printing devices can efficiently print cached bitmap characters. Unlike outline characters, bitmap characters are rendered into an arrangement of pixels or bitmap one time, stored in cache memory, and can be efficiently printed many times without causing printing delays. However, bitmap characters, unlike outline characters, are not scalable and typically have a different character cached for different sizes. Bitmap characters do not provide the crisp, resolution-independent design desired by graphic designers.

While the general concept of caching bitmap characters for efficient printing is known, the present disclosure provides specific technical improvements for storing mathematical expressions as scanline tables for outline characters in the cache memory of a printing device to improve the speed and performance of printing outline characters.

Implementations described herein address these and other problems by allocating space in the cache memory of a printing device for registration of an outline character. A data portion (scanline table) and a metadata portion (outline character descriptor) for an outline character are stored in the cache memory of the printing device. When print job data is received, the printing device determines the print job data specifies the outline character. The scanline table from the cache memory of the printing device is rendered for the outline character and printed by the printing device without having to fetch additional data from a non-printing device.

II. Example Printing Systems

FIG. 1 is a block diagram illustrating printing network 100, according to an example embodiment. Printing network 100 includes one or more non-printing devices 120, 122, 124, 126, 128, 129, 140 and one or more printing devices 130, 142 interconnected using network 150. In some examples, printing network 100 can have more, fewer, and/or different types of non-printing devices and/or printing devices than indicated in FIG. 1.

Non-printing devices 120, 122, 124, 126, 128, 129, 140 can be or include computing devices configured to communicate with each other and with printing devices 130, 142 using network 150. Printing devices 130, 142 can include devices configured to scan, print, copy, e-mail, account, communicate, and/or otherwise process images, documents, and/or files that are originally available either on paper or electronically. In printing network 100, a non-printing device can be a computing device that is not a printing device, where the non-printing device can be configured to communicate with other non-printing devices and with printing devices 130, 142 using network 150. In particular, a non-printing device typically does not print images, documents, and/or files to paper and typically does not scan images, documents, and/or files from paper, while printing devices typically do print images, documents, and/or files to paper and typically do scan images, documents, and/or files from paper.

After processing by one or more of printing devices 130, 142, the images, documents, and/or files can be subsequently available either on paper or electronically, as requested. That is, printing devices 130, 142 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 130, 142 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage, and usage limits.

In some embodiments, printing devices 130, 142 can perform other tasks and/or other processing as well. Printing devices 130, 142 can include products from various manufacturers with variations in color, speed, computing power, functionality, network connectivity, and/or other features.

In an example embodiment, some or all printing devices 130, 142 can be connected to network 150 through one or more, possibly different, network protocols. Data can be transmitted between printing devices 130, 142, non-printing devices 120, 122, 124, 126, 128, 129, 140 over wired and/or wireless links between non-printing devices, printing devices, and network 150. The format of each respective data transmission between devices in printing network 100 can include one or more of a variety of different formats including: text formats, image formats, extensible mark-up language (XML), database tables, a flat file format, or another format. In some embodiments, a non-printing device can be configured to act as a print server for one or more printing devices. A print server can be configured to process jobs (e.g., spool job-related data, route jobs, provide user and/or server-related accounting for jobs, verify/enforce authentication and authorization rules related to jobs) and store data related to printing devices in printing network 100. For example, in printing network 100, non-printing device 140 is configured to be a print server for at least printing device 142.

Communications between the non-printing devices, and printing devices can include: non-printing devices 120, 122, 124, 126, 128, 129, 140 sending data for print jobs and/or print job portions for printing to printing devices 130, 142 and printing devices 130, 142 sending alert, status, error, and/or other messages to inform other devices about error or other conditions of the printing devices; e.g., idle, printing, sleeping, paper jam, low or out of paper, low or out of toner/ink, etc. Other communications between one or more non-printing devices and one or more printing devices are possible as well.

III. Example Computing Devices

Figure 2:
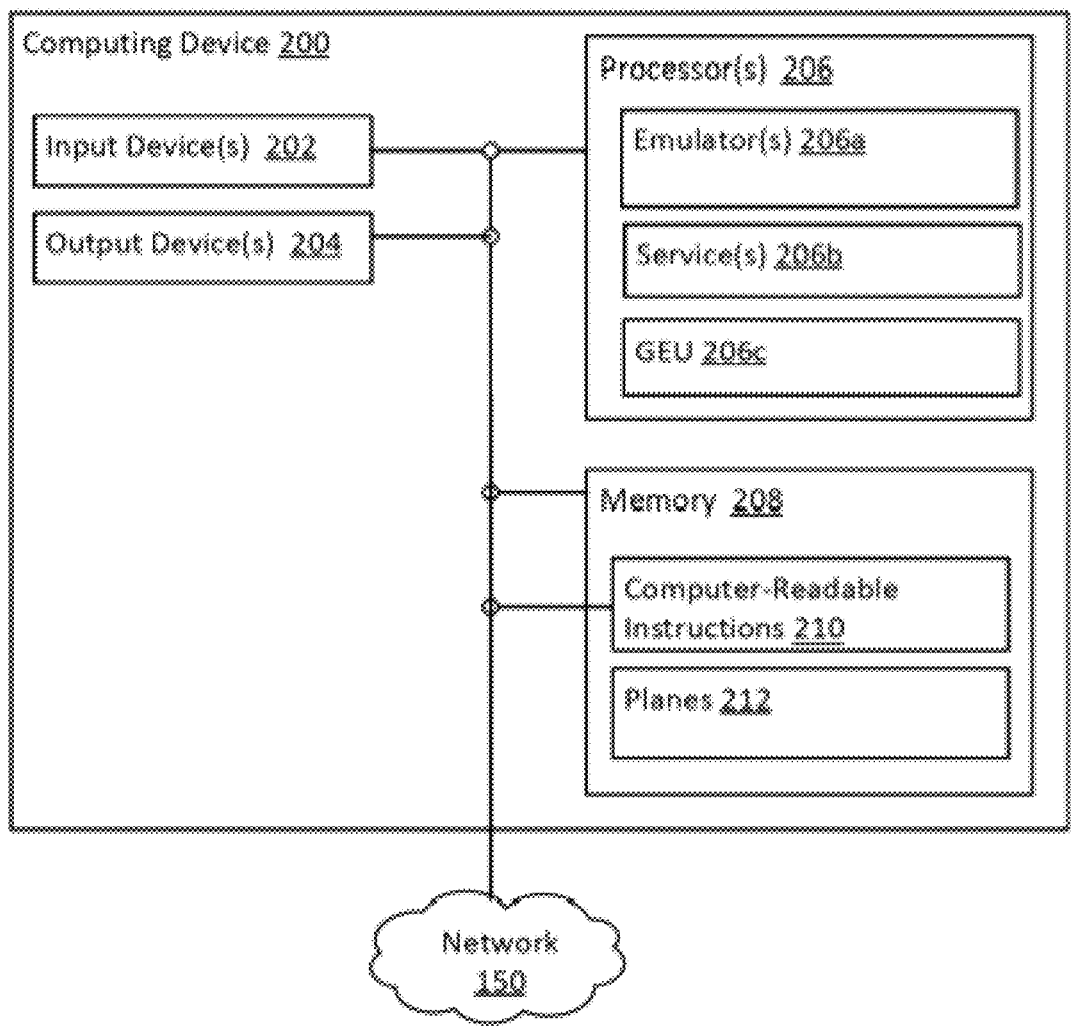
FIG. 2 is a block diagram illustrating a computing device, according to an example embodiment.

FIG. 2 is a schematic block diagram illustrating computing device 200, according to an example embodiment. In some embodiments, computing device 200 can be configured to perform one or more herein-described functions of and/or related to: a printing pipeline, an emulator, service(s), a Graphical Execution Unit (GEU), printing network 100, non-printing devices 120, 122, 124, 126, 128, 129, 140, printing devices 130, 142, and methods 400, 500, 700.

Computing device 200 can include one or more input devices 202, one or more output devices 204, one or more processors 206 and memory 208. Input devices 202 can include user input devices, network input devices, sensors, and/or other types of input devices. For example, input devices 202 can include user input devices such as, files, and/or images, a touch screen, a keyboard, a keypad, a computer mouse, a track ball, a joystick, a camera, a voice recognition module, scanning components for electronically scanning paper documents, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, Global Positioning System (GPS) sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 206 can be configured to execute computer-readable instructions 210 that are contained in memory 208 and/or other instructions as described herein.

In some examples, such as shown in FIG. 2, processors 206 can include or provide functionality relating to one or more emulators 206a, one or more services 206b (e.g., graphics services and/or drawing services), and/or one or more Graphical Execution Units (GEUs).

Memory 208 can include non-transitory computer-readable storage configured to store data and/or instructions. In particular, memory 208 can store computer-readable instructions 210 that, when executed by processor(s) 206, can cause computing device 200 to perform functions, such as but not limited to, functions of herein-described software, devices, networks, methods, features, and scenarios.

IV. Outline Character Printing on a Printing Device

Printing Pipeline

Figure 3:
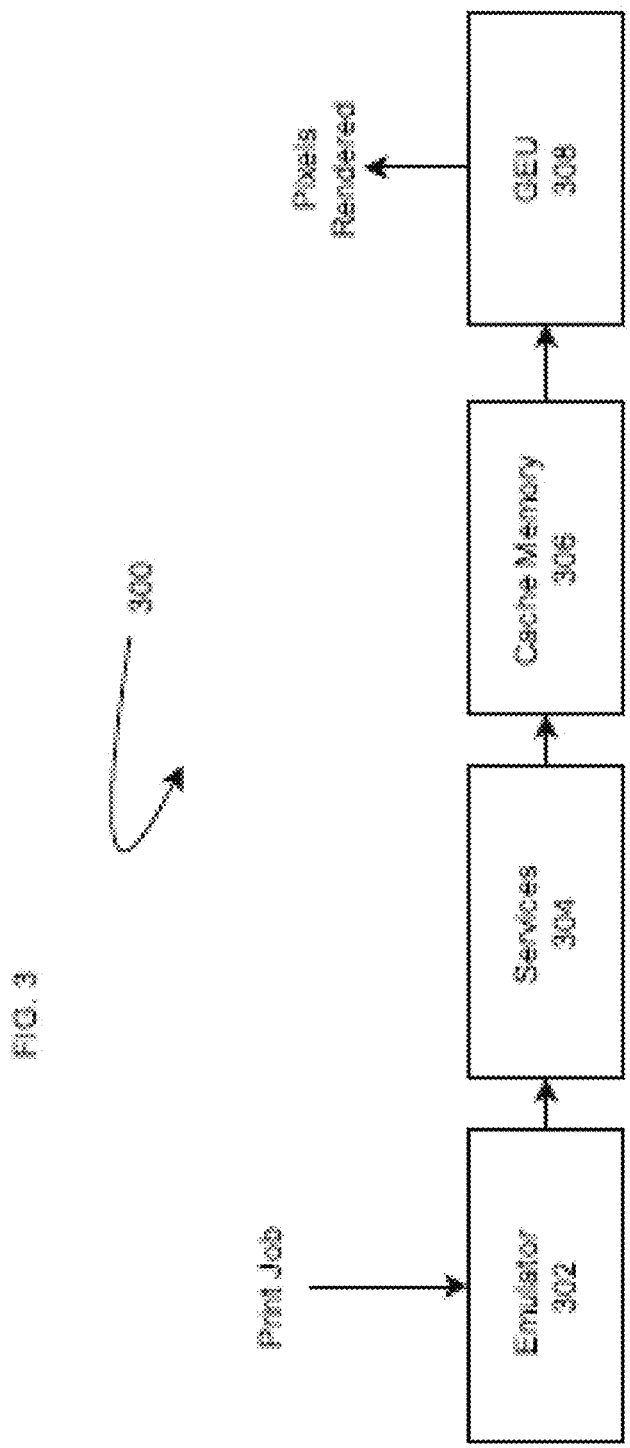
FIG. 3 is block diagram illustrating a printing pipeline for a printing device, according to an example embodiment.

FIG. 3 is conceptual block diagram illustrating a Raster Image Processor (RIP) printing pipeline 300 for a printing device, according to an example embodiment. The printing device may be a printing device similar to the printing devices 130 and 142, for example.

The printing pipeline includes an emulator 302, service(s) 304, cache memory 306, and a graphics execution unit 308. Variations of the printing pipeline, such as those utilized by different manufacturers and/or for different models of printing devices, may refer to the components of the printing pipeline 300 using different terminology. In addition, more or fewer components may be included in a particular printing pipeline, and functions of one component in one printing pipeline may be split and carried out by more than one component in another printing pipeline. Similarly, functions carried out by more than one component in a particular printing pipeline may be carried out by a single component in another printing pipeline. As used herein, the term "component" may refer to a functional component or a physical (e.g., hardware) component.

The emulator 302 acts as an interpreter for incoming print jobs. It reads and decodes a job written in a page description language (PDL), such as PDF, or other format, such as TIFF, JPEG, or PNG. Emulator 302 reads and decodes data for a printing job to determine an outline character is to be printed by the printing device and the scaling data for the outline character.

If the outline character to be printed is not in the cache memory of the printing device, service(s) 304 fetches data from third-party service, such as a third-party rasterizer. The data includes a generated mathematical expression and metadata for the outline character. Service(s) 304 (e.g., a printer drawing service) converts the mathematical expression for the outline character to a data portion (a scanline table) and the metadata portion to a description of the outline character.

Cache memory 306 allocates memory for storing the metadata portion and data portion (the scanline table) for the outline character in the cache memory of a printing device. If the emulator 302 encounters the outline character again in the same or different printing job, the scanline table stored in cache memory 306 is sent to the GEU 308 for rendering without service(s) 304 having to fetch data from a font rasterizer or other non-printing device and not needing to convert mathematical expressions into a scanline table again, thus speeding up the printing process. Avoiding re-accessing the mathematical expressions from a font rasterizer or other non-printing device and not needing to convert mathematical expressions into scanline table again, provides a substantial speedup in printing.

The GEU 308 receives the scanline table and renders it into pixels for marking on a printed page. GEU 308 uses scaling data received by emulator 302, to appropriately size the outline character. In an exemplary embodiment, scaling data utilizes the scanline table to make a scaled copy of the outline character. The scanline table is a set of coordinates that can be easily scaled by multiplying the end coordinates of each scanline. For the scaled copy, original sides of the character (polygon) are multiplied by the scale factor. If the outline character is a rectangle with two short sides of 2 units and two long sides of 4 units using a scale factor of 3, the short sides of the outline character with a scale factor of 3 will be 6 units and the long sides will be 12 units. The GEU 308 renders graphical elements (e.g., each side of an outline character) into an appropriate pattern of pixels to form an output raster that is sent to the marking engine for printing on a page.

Figure 4:
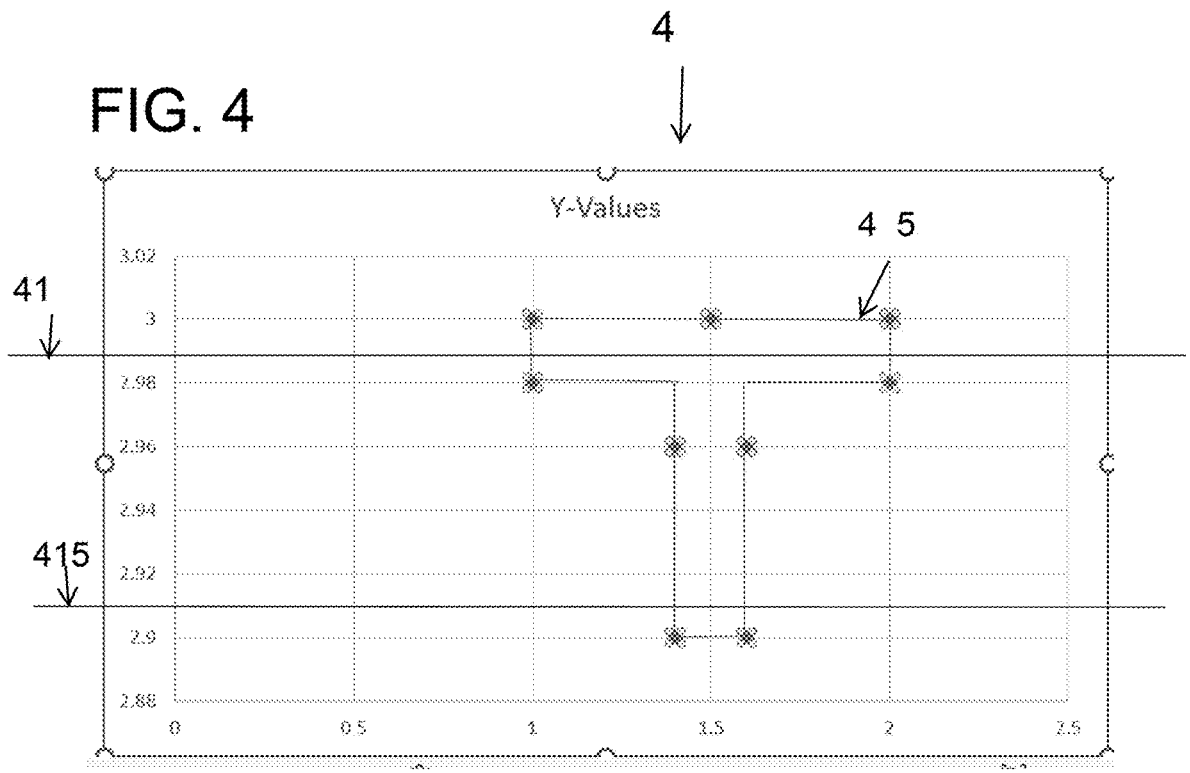
FIG. 4 is a pictorial diagram illustrating an exemplary scanline table for implementation of a system and method caching outline characters in a printed document, according to an example embodiment.

FIG. 4 is a pictorial diagram illustrating an exemplary scanline table for implementation of a system and method caching outline characters in a printed document. Exemplary scanline table 400 is exemplary output of the mathematical expression received for an outline character.

Exemplary scanline table 400 depicts the edges of the projected character (polygon) having the geometric shape of a "T". The scanline table 400 depicts an outline character (polygon) table having color, edge pointer and edge coefficients. The edges of the projected outline character are sorted into buckets, one per scanline. An active edge table (AET) maintains sort links, X coordinates, gradients, and references to the outline character.

Scanline rendering works on a row-by-row basis rather than a polygon-by-polygon or pixel-by-pixel basis. The outline character to be rendered is sorted by the top y coordinate at which it first appears, then each row (or scanline) of the outline character is computed using the intersection of a scanline with the outline character (polygon). A scanline table is processed from left to right, top to bottom and always has the y coordinate same for a scanline, between two coordinates.

In the exemplary scanline table 400, exemplary scanlines 410 and 415 intersect the outline character 405 "T". When rendering scanline table 400, for exemplary scanline 410, pixel(s) are rendered at the edges X 1 and Y 2.99 and X 2 and Y 2.99 to form a row of the outline character 405 "T". For exemplary scanline 415, pixel(s) are rendered at the edges X 1.4 and Y 2.91 and X 1.6 and Y 2.91 to form a row of the outline character 405 "T".

In other examples, pixel composition can be based on more, fewer, and/or different edges. As previously mentioned, information pertaining an outline character is stored in a scanline table. Similarly, information pertaining to other outline characters is stored in one or more separate scanline tables. For example, a different scanline table for an outline character having the geometric shape of "C" may be generated and/or maintained by the emulator.

Figure 5:
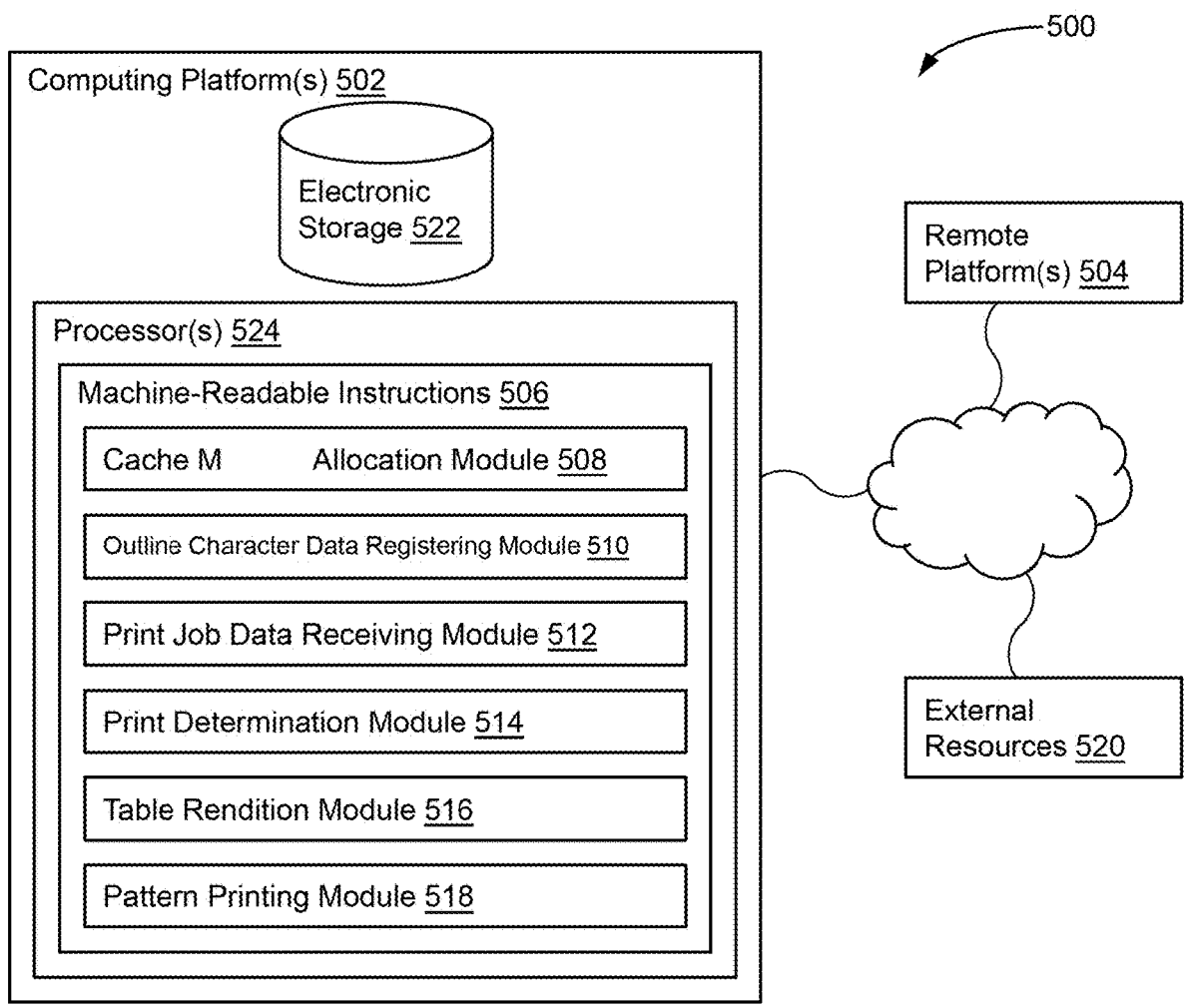
FIG. 5 illustrates a system configured for outline character printing on a printing device, in accordance with one or more example embodiments.

FIG. 5 illustrates a system 500 configured for outline character printing on a printing device, in accordance with one or more embodiments. In some embodiments, system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of cache allocation module 508, outline character data registering module 510, print job data receiving module 512, print determination module 514, table rendition module 516, pattern printing module 518, and/or other instruction modules.

Cache allocation module 508 may be configured to allocate cache memory of a printing device for registration of an outline character.

By way of non-limiting example, the printing device may be configured to print images, documents, and/or files to paper. The outline character may be a geometric outline of a letter or character. The outline character may be scalable. The outline character can be smoothed and scaled more easily than bitmapped characters.

By way of non-limiting example, a shape of the outline character may be represented by a mathematical expression, which determines one or more of style, shape, height, space and width of the outline character. The cache memory may include a data portion and a metadata portion for the outline character.

By way of non-limiting example, cache memory of a printing device is a portion of random-access memory (RAM) set aside. Cache memory temporarily stores data in the RAM of the printing device to enable fast retrievals of that data. Accessing RAM of the printing device is significantly faster than accessing data from a non-printing device. Cache memory helps emulator run faster due to faster access to data. Cache memory stores mathematical expressions and data calculations that are otherwise time-consuming to compute. By storing the calculations in a cache, the system saves time by avoiding the repetition of the calculation As the emulator of the printing device reads print job data received for printing, it checks to see if the desired outline character already exists in the memory cache. If it does, then the emulator will read the data from the cache, thus eliminating the slower access to non-printing devices. If the desired outline character is not registered in the cache memory of the printing device, then the emulator fetches the data from a non-printing device. When it receives the data, such as a mathematical expression for the outline character, the emulator generates and writes the scanline table for the outline character to the memory cache so that when the emulator encounters the outline character in the figure, the emulator can quickly get the scanline table from the cache memory.

Outline character data registering module 510 may be configured to register outline character data wherein the metadata portion includes a description of the outline character, and the data portion includes a scanline table for the outline character. The outline character may be rendered utilizing the scanline table and the scaling data. The scanline table may include a mathematical expression for rendering the outline character. Storing the mathematical expression in the cache memory may save time by avoiding repeating calculations. Storing the mathematical expression in the cache memory may improve performance of the printing device.

The scanline table may include a polygon table and an active edge table. The mathematical expressions (i.e., data) for an outline character may be received by the printing device from a third-party rasterizer or other non-printing device, such as Monotype Imaging Holdings Inc., rasterizer The mathematical expressions (i.e., data) outline character may be used to generate and store the scanline table for the outline character. The scanline table for the outline character may be rendered multiple times for the single print job.

Print job data receiving module 512 may be configured to receive a print job data at the printing device. The print job data may include a handle and a scaling data. The handle may be an identifier of an outline character to be rendered. The print job data may further include scaling data for determining a size of the outline character.

Print determination module 514 may be configured to determine the print job data identifies the outline character in the cache memory at the printing device. The handle of the print job data may be compared to the metadata portion of the outline character to determine the handle identifies the outline character in the cache memory of the printing device. The outline character data and the print job data received may be part of a single print job.

Table rendition module 516 may be configured to render the scanline table accessed from the cache memory as a pattern of pixels for the outline character for the print job data received. A graphical execution unit of the printing device may utilize the scanline table to render the pattern of pixels to form an output raster that is sent to a marking engine for printing on a page.

Pattern printing module 518 may be configured to print to paper, on the printing device, the pattern of pixels rendered from the scanline table accessed from the cache memory for the print job data received. The pixels may be rendered on a row-by-row basis rather than a polygon-by-polygon or pixel-by-pixel basis. The outline character may be rendered and printed multiple times as a watermark for the single print job. The outline character may be rendered and printed multiple times as a security watermark for the single print job. The outline character may be rendered and printed on multiple pages for the single print job. The outline character may be rendered and printed in different sizes for the single print job. The outline character may be rendered and printed for different print jobs. The outline character may be rendered and printed in different sizes for the different print jobs.

In some implementations, computing platform(s) 502, remote platform(s) 504, and/or external resources 520 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 520 may be operatively linked via some other communication media.

A given remote platform 504 may include one or more processors configured to execute computer program modules. The computer program modules may be configured to enable an expert or user associated with the given remote platform 504 to interface with system 500 and/or external resources 520, and/or provide other functionality attributed herein to remote platform(s) 504. By way of non-limiting example, a given remote platform 504 and/or a given computing platform 502 may include one or more of a printing device, a non-printing device, a server, a desktop computer, a laptop computer, a handheld computer, a tablet computing platform, a NetBook, a Smartphone, a gaming console, and/or other computing platforms.

External resources 520 may include sources of information outside of system 500, external entities participating with system 500, and/or other resources. In some implementations, some or all of the functionality attributed herein to external resources 520 may be provided by resources included in system 500.

Computing platform(s) 502 may include electronic storage 522, one or more processors 524, and/or other components. Computing platform(s) 502 may include communication lines, or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 522 may comprise non-transitory storage media that electronically stores information. The electronic storage media of electronic storage 522 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 522 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 522 may include one or more virtual storage resources (e.g., cloud storage, a virtual private network, and/or other virtual storage resources). Electronic storage 522 may store software algorithms, information determined by processor(s) 524, information received from computing platform(s) 502, information received from remote platform(s) 504, and/or other information that enables computing platform(s) 502 to function as described herein.

Processor(s) 524 may be configured to provide information processing capabilities in computing platform(s) 502. As such, processor(s) 524 may include one or more of a digital processor, an analog processor, a digital circuit designed to process information, an analog circuit designed to process information, a state machine, and/or other mechanisms for electronically processing information. Although processor(s) 524 is shown in FIG. 5 as a single entity, this is for illustrative purposes only. In some implementations, processor(s) 524 may include a plurality of processing units. These processing units may be physically located within the same device, or processor(s) 524 may represent processing functionality of a plurality of devices operating in coordination. Processor(s) 524 may be configured to execute modules 508, 510, 512, 514, 516, and/or 518, and/or other modules. Processor(s) 524 may be configured to execute modules 508, 510, 512, 514, 516, and/or 518, and/or other modules by software; hardware; firmware; some combination of software, hardware, and/or firmware; and/or other mechanisms for configuring processing capabilities on processor(s) 524. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, and/or 518 are illustrated in FIG. 5 as being implemented within a single processing unit, in implementations in which processor(s) 524 includes multiple processing units, one or more of modules 508, 510, 512, 514, 516, and/or 518 may be implemented remotely from the other modules. The description of the functionality provided by the different modules 508, 510, 512, 514, 516, and/or 518 described below is for illustrative purposes, and is not intended to be limiting, as any of modules 508, 510, 512, 514, 516, and/or 518 may provide more or less functionality than is described. For example, one or more of modules 508, 510, 512, 514, 516, and/or 518 may be eliminated, and some or all of its functionality may be provided by other ones of modules 508, 510, 512, 514, 516, and/or 518. As another example, processor(s) 524 may be configured to execute one or more additional modules that may perform some or all of the functionality attributed below to one of modules 508, 510, 512, 514, 516, and/or 518.

Figure 6:
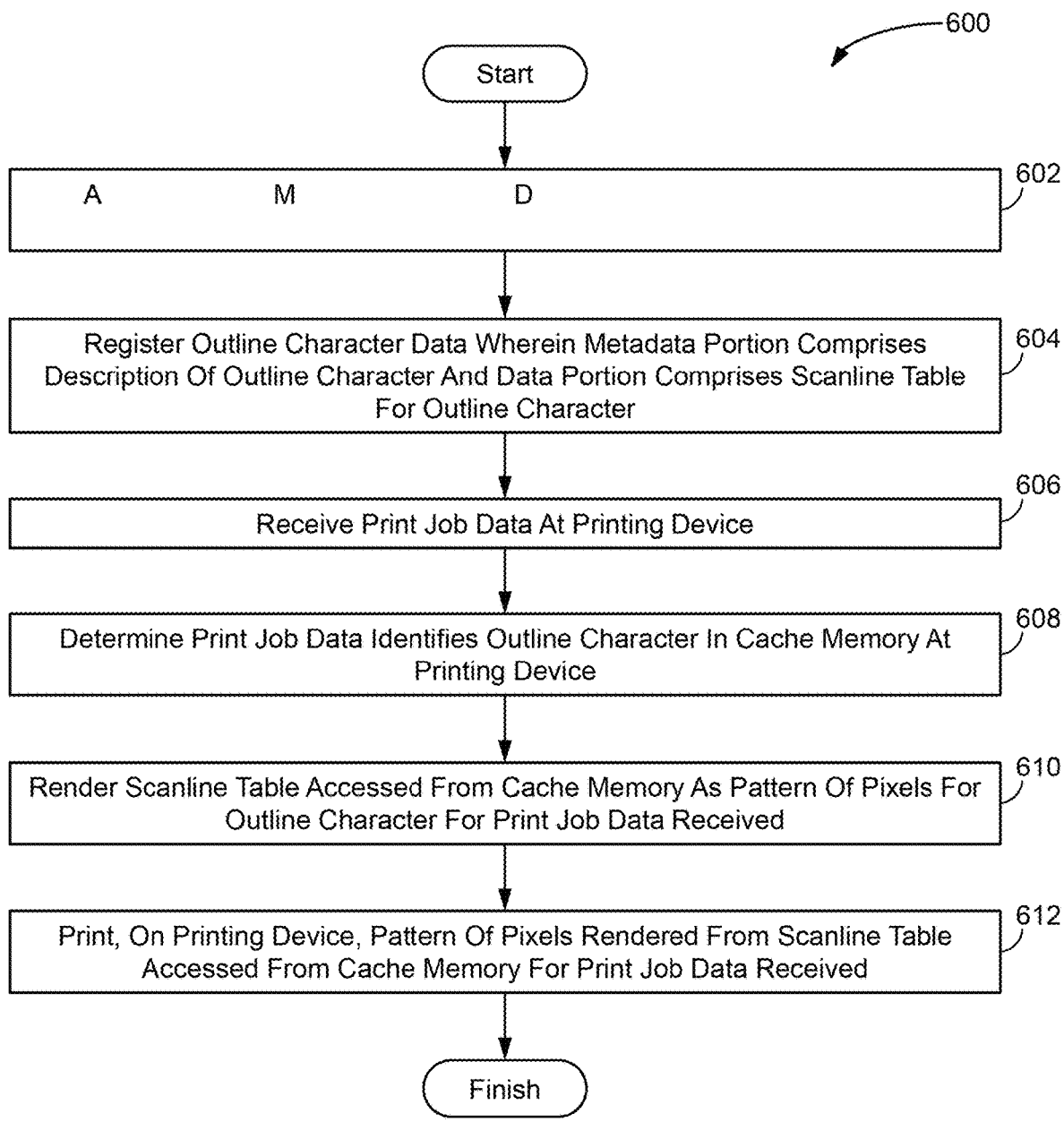
FIG. 6 illustrates a method for outline character printing on a printing device, in accordance with one or more example embodiments.

FIG. 6 is a flow diagram illustrating a method 600 for outline character printing on a printing device, according to an example embodiment. Method 600 can be executed by one or more processors, such as processor 206 illustrated in FIG. 2 and/or processor(s) 524 illustrated in FIG. 5. Such processor may take the form of an ASIC, for example. The method 800 can be performed by a printing device, such as printing devices 130 and/or 142, computing platform(s) 502, and/or other devices, on a print job file, for example. The order of the blocks in the method 600 can be performed in a different sequence than that listed, and some blocks may be performed in parallel with other blocks.

At block 602, the method 600 may include allocating cache memory of a printing device for registration of an outline character. The cache memory may include a data portion and a metadata portion. The functions at block 602 may be performed by one or more hardware processors configured by the cache allocation module 508 of FIG. 5, in accordance with one or more embodiments.

At block 604, the method 600 may include registering outline character data wherein the metadata portion includes a description of the outline character, and the data portion includes a scanline table for the outline character. The functions at block 604 may be performed by one or more hardware processors configured by the outline character data registering module 710 of FIG. 7, in accordance with one or more embodiments.

At block 606, the method 600 may include receiving a print job data at the printing device. The functions at block

606 may be performed by one or more hardware processors configured by the print job data receiving module 512 of FIG. 5, in accordance with one or more embodiments.

At block 608, the method 600 may include determining the print job data identifies the outline character in the cache memory at the printing device. The functions at block 608 may be performed by one or more hardware processors configured by the print determination module 514 of FIG. 5, in accordance with one or more embodiments.

At block 610, the method 600 may include rendering the scanline table accessed from the cache memory as a pattern of pixels for the outline character for the print job data received. The functions at block 610 may be performed by one or more hardware processors configured by the table rendition module 516 of FIG. 5, in accordance with one or more embodiments.

At block 612, the method 600 may include printing, on the printing device, the pattern of pixels rendered from the scanline table accessed from the cache memory for the print job data received. The functions at block 612 may be performed by one or more hardware processors configured by the pattern printing module 518 of FIG. 5, in accordance with one or more embodiments.

EXAMPLES

Figure 7:
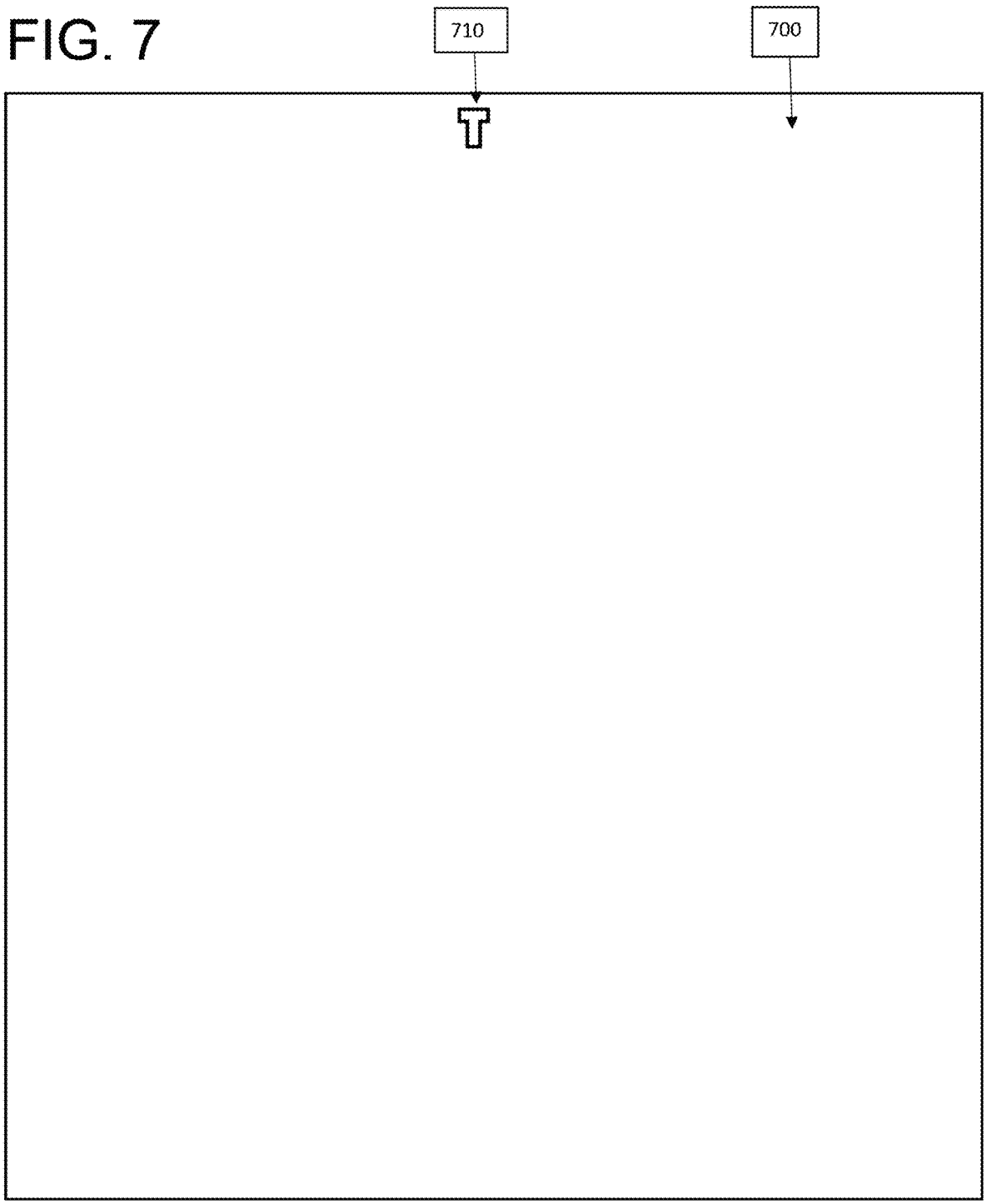
FIG. 7 is a pictorial diagram illustrating an example print output of an outline character, according to an example embodiment.
Figure 8:
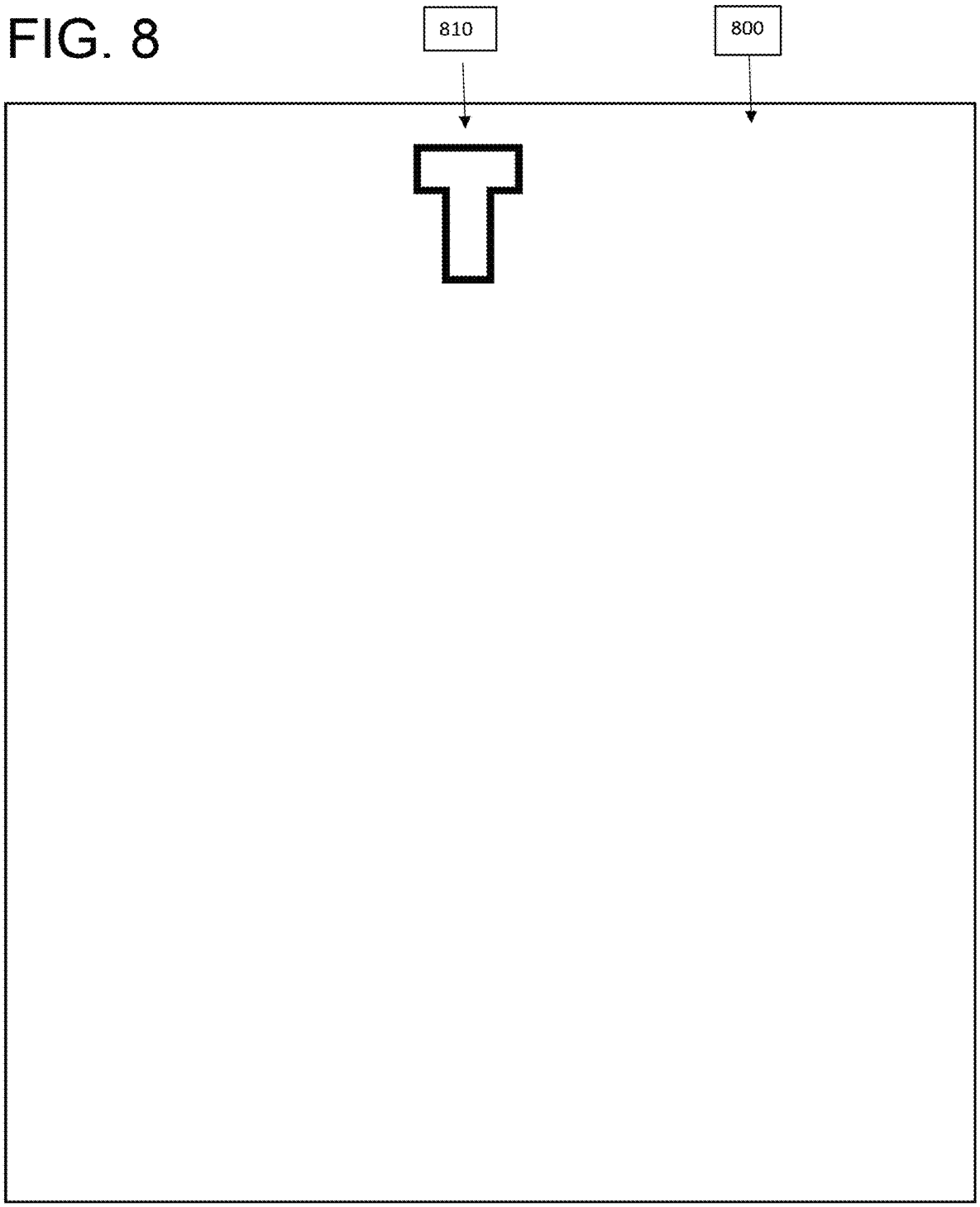
FIG. 8 is a pictorial diagram illustrating an example print output of an outline character, according to an example embodiment.

FIGS. 7 and 8 are pictorial diagrams illustrating an example print output 700 and 800, by a printing device according to an example embodiment. The example print output 700 and 800 illustrates an outline character rendered according to different scaling data. In contrast, a bitmap character is rendered a single time and different bitmaps are required for different sizes of the bitmap character.

FIG. 7 is a pictorial diagram 700 illustrating an example print output of an outline character 710, according to an example embodiment. The printing device reads print job data received for printing and checks to see if the desired outline character already exists in the memory cache. Print determination module 514 determines the print job data identifies the outline character in the geometric shape of "T" in the cache memory at the printing device. In an example, the handle of the print job data is compared to the metadata portion of the outline character to determine the handle identifies the outline character in the cache memory of the printing device. For example, a handle identifying the outline character as T1 is matched to the description of the outline character "T" in the cache memory of the printing device.

Table rendition module 516 renders the scanline table accessed from the cache memory as a pattern of pixels for the outline character 710 in the geometric shape of "T" for the print job data received. A graphical execution unit of the printing device may utilize the scanline table to render the pattern of pixels to form the geographic shape of "T" which is sent a marking engine for printing on a page 700.

FIG. 8 is a pictorial diagram 800 illustrating an example print output of an outline character 810 applying a scale factor of 3, according to an example embodiment. The printing device reads print job data received for printing and checks to see if the desired outline character already exists in the memory cache. Print determination module 514 determines the print job data identifies the outline character in the geometric shape of "T" in the cache memory at the printing device. In an example, the handle of the print job data is compared to the metadata portion of the outline character to determine the handle identifies the outline character in the cache memory of the printing device. For example, a handle identifying the outline character as T1 is matched to the description of the outline character "T" in the cache memory of the printing device.

The print job data received indicated that the outline character was to be printed with a scale factor of 3. Table rendition module 516 renders the scanline table accessed from the cache memory as a pattern of pixels for the outline character 810 in the geometric shape of "T" and applies a scale factor of 3. A graphical execution unit of the printing device may utilize the scanline table to render the pattern of pixels to form the geographic shape of "T" where the original sides of the outline factor are multiplied by the scale factor of 3. The scaled outline character rendered is sent a marking engine for printing on a page 800.

V. Conclusion

The above detailed description sets forth various features and operations of the disclosed systems, apparatus, devices, and/or methods with reference to the accompanying figures. The example embodiments described herein and in the figures are not meant to be limiting, with the true scope being indicated by the following claims. Many modifications and variations can be made without departing from its scope, as will be apparent to those skilled in the art. Functionally equivalent systems, apparatus, devices, and/or methods within the scope of the disclosure, in addition to those described herein, will be apparent to those skilled in the art from the foregoing descriptions. It will be readily understood that the aspects of the present disclosure, as generally described herein, and illustrated in the figures, can be arranged, substituted, combined, separated, and designed in a wide variety of different configurations. Such modifications and variations are intended to fall within the scope of the appended claims. Finally, all publications, patents, and patent applications cited herein are hereby incorporated herein by reference for all purposes.

The invention claimed is:

1. A method for outline character printing on a printing device, comprising:
    receiving a print job at the printing device, wherein the print job includes print job data;
    determining, by the printing device, that the print job data identifies an outline character;
    determining whether a cache memory in the printing device includes a registration of the outline character included in the print job data;
    upon determining that the cache memory in the printing device does not include the registration of the outline character:
        retrieving, from a third-party service, outline character data corresponding to the outline character, wherein the outline character data includes a generated mathematical expression and metadata for the outline character;
        converting the generated mathematical expression into a scanline table for the outline character; and
        registering the outline character data in an allocated portion of the cache memory, wherein the allocated portion of the cache memory includes (a) a metadata portion comprising a description of the outline character and (b) a data portion comprising the scanline table for the outline character; and
    upon determining that the cache memory in the printing device does include the registration of the outline character:

rendering, without retrieving the outline character data from the third-party service, the scanline table accessed from the cache memory as a pattern of pixels for the outline character for the print job data received; and printing, on the printing device, the pattern of pixels rendered from the scanline table accessed from the cache memory for the print job data received.

2. The method of claim 1, wherein the cache memory is random access memory of the printing device.

3. The method of claim 1, wherein the printing device is configured to print images, documents, and/or files to paper.

4. The method of claim 1, wherein the outline character is a geometric outline of a letter or character.

5. The method of claim 4, wherein the outline character is scalable.

6. The method of claim 5, wherein the outline character can be smoothed and scaled more easily than bitmapped characters.

7. The method of claim 1, wherein the print job data comprises a handle and a scaling data.

8. A system configured for outline character printing on a printing device, the system comprising:
one or more hardware processors configured by machine-readable instructions to:
receive a print job at the printing device, wherein the print job includes print job data;
determine, by the printing device, that the print job data identifies an outline character;
determine whether a cache memory in the printing device includes a registration of the outline character included in the print job data;
upon determining that the cache memory in the printing device does not include the registration of the outline character:
retrieve, from a third-party service, outline character data corresponding to the outline character, wherein the outline character data includes a generated mathematical expression and metadata for the outline character;
convert the generated mathematical expression into a scanline table for the outline character; and
register the outline character data in an allocated portion of the cache memory, wherein the allocated portion of the cache memory includes (a) a metadata portion comprising a description of the outline character and (b) a data portion comprising the scanline table for the outline character; and
upon determining that the cache memory in the printing device does include the registration of the outline character:
render, without retrieving the outline character data from the third-party service, the scanline table accessed from the cache memory as a pattern of pixels for the outline character for the print job data received; and
print, on the printing device, the pattern of pixels rendered from the scanline table accessed from the cache memory for the print job data received.

9. The system of claim 8, wherein the cache memory is random access memory of the printing device.

10. The system of claim 8, wherein the printing device is configured to print images, documents, and/or files to paper.

11. The system of claim 8, wherein the outline character is a geometric outline of a letter or character.

12. The system of claim 11, wherein the outline character is scalable.

13. The system of claim 12, wherein the outline character can be smoothed and scaled more easily than bitmapped characters.

14. The system of claim 8, wherein the print job data comprises a handle and a scaling data.

15. A non-transitory computer-readable storage medium having instructions embodied thereon, the instructions being executable by one or more processors to perform a method for outline character printing on a printing device, the method comprising:
receiving a print job at the printing device, wherein the print job includes print job data;
determining, by the printing device, that the print job data identifies an outline character;
determining whether a cache memory in the printing device includes a registration of the outline character included in the print job data;
upon determining that the cache memory in the printing device does not include the registration of the outline character:
retrieving, from a third-party service, outline character data corresponding to the outline character, wherein the outline character data includes a generated mathematical expression and metadata for the outline character;
converting the generated mathematical expression into a scanline table for the outline character; and
registering the outline character data in an allocated portion of the cache memory, wherein the allocated portion of the cache memory includes (a) a metadata portion comprising a description of the outline character and (b) a data portion comprising the scanline table for the outline character; and
upon determining that the cache memory in the printing device does include the registration of the outline character:
rendering, without retrieving the outline character data from the third-party service, the scanline table accessed from the cache memory as a pattern of pixels for the outline character for the print job data received; and
printing, on the printing device, the pattern of pixels rendered from the scanline table accessed from the cache memory for the print job data received.

16. The computer-readable storage medium of claim 15, wherein the cache memory is random access memory of the printing device.

17. The computer-readable storage medium of claim 15, wherein the printing device is configured to print images, documents, and/or files to paper.

18. The computer-readable storage medium of claim 15, wherein the outline character is a geometric outline of a letter or character.

19. The computer-readable storage medium of claim 18, wherein the outline character is scalable.

20. The computer-readable storage medium of claim 19, wherein the outline character can be smoothed and scaled more easily than bitmapped characters.

* * * * *